United States Patent [19]
Becker et al.

[11] Patent Number: 5,913,374
[45] Date of Patent: Jun. 22, 1999

[54] UNDERCARRIAGE ASSEMBLY OF A TRACK-TYPE WORK MACHINE

[75] Inventors: Dan J. Becker, Peoria; Craig R. Gustin, Rochelle, both of Ill.

[73] Assignee: Caterpillar Paving Products Inc., Minneapolis, Minn.

[21] Appl. No.: 08/841,954

[22] Filed: Apr. 8, 1997

[51] Int. Cl.⁶ .................................................. B62D 55/00
[52] U.S. Cl. .......................................................... 180/9.1
[58] Field of Search ........................... 180/9.1, 9.5, 9.52, 180/9.54, 9.62, 9.64; 305/165, 178; 152/209 D

[56] References Cited

U.S. PATENT DOCUMENTS

| | | | |
|---|---|---|---|
| 4,412,575 | 11/1983 | Maeda et al. | 152/209 D |
| 4,445,561 | 5/1984 | Kono et al. | 152/209 D |
| 4,721,498 | 1/1988 | Grob | 474/261 |
| 4,990,125 | 2/1991 | Stuemky et al. | 474/261 |
| 5,005,921 | 4/1991 | Edwards et al. | 305/35 EB |
| 5,005,922 | 4/1991 | Edwards et al. | 305/35 EB |
| 5,020,865 | 6/1991 | Edwards et al. | 305/35 EB |
| 5,211,609 | 5/1993 | Haines | 474/260 |
| 5,326,332 | 7/1994 | Bargfrede et al. | 474/249 |
| 5,494,125 | 2/1996 | Gustin et al. | 180/9.1 |

FOREIGN PATENT DOCUMENTS 62-120202  6/1987  Japan ................. 152/209 D

*Primary Examiner*—Lanna Mai
*Assistant Examiner*—Faye M. Fleming
*Attorney, Agent, or Firm*—Steven G. Kibby

[57] ABSTRACT

An undercarriage assembly of a track-type work machine includes a drive wheel, an idler wheel, and a plurality of track supporting rollers. The assembly also includes a track belt which contacts the drive wheel, the idler wheel, and each of the plurality of track supporting rollers. The plurality of track supporting rollers includes a first left roller group, a second left roller group, a middle roller group, a first right roller group, and a second right roller group. The plurality of track supporting rollers cooperate with the track belt in order to reduce the number of vibrations and shocks during operation of the track-type work machine.

14 Claims, 9 Drawing Sheets

UNDERCARRIAGE ASSEMBLY OF A TRACK-TYPE WORK MACHINE

BACKGROUND OF THE INVENTION

The present invention relates generally to track-type work machines, and more particularly to an undercarriage assembly of a track-type work machine.

Many track-type work machines such as asphalt pavers are supported and propelled by an undercarriage assembly which includes an endless track belt having a plurality of tread bars defined thereon. The undercarriage assembly also includes a drive wheel and an idler wheel, around which the track belt is advanced. The undercarriage assembly further includes a plurality of track supporting rollers which guide the track belt and support it as the track-type work machine travels over various ground conditions.

Vibrations and shocks are often generated when one of the track supporting rollers contacts a discontinuity in the surface of the track belt, such as a groove between adjacent tread bars. Such vibrations and shocks cause upward and downward movements of the track-type work machine while in motion. Such upward and downward movements may lead to poor ride quality, particularly at high speeds. In addition, the upward and downward movements may cause the quality of the work being performed by the track-type work machine to decrease. For example, in the case of an asphalt paver the upward and downward movements may cause an unevenness in topography of the asphalt being applied by the paver.

What is needed therefore is an undercarriage assembly which provides for low-vibration operation of a track-type work machine.

SUMMARY OF THE INVENTION

In accordance with one embodiment of the present invention, there is provided an undercarriage assembly of a track-type work machine. The assembly includes a drive wheel, an idler wheel, and a plurality of track supporting rollers. The assembly also includes a track belt which contacts the drive wheel, the idler wheel, and each of the plurality of track supporting rollers. The track belt includes a track base having a left lateral edge and a right lateral edge. The track base defines a midline spaced equidistant from the left lateral edge and the right lateral edge so as to define a left region and a right region. The track belt further includes a plurality of left tread bars secured to the track base. Each left tread bar has an outer edge. The outer edge of the each left tread bar is positioned adjacent to the left lateral edge of the track base. The track belt further includes a plurality of right tread bars secured to the track base. Each right tread bar has an outer edge. The outer edge of the each right tread bar is positioned adjacent to the right lateral edge of the track base. A portion of the each left tread bar is positioned in the right region, and a portion of the each right tread bar is positioned in the left region. A majority of the each left tread bar is positioned in the left region, and a majority of the each right tread bar is positioned in the right region. The plurality of track supporting rollers includes a first left roller group, a second left roller group, a middle roller group, a first right roller group, and a second right roller group. A first left axis defined by the first left roller group is spaced apart by a first distance ($S_1$) from a middle axis defined by the middle roller group. The first left axis defined by the first left roller group is spaced apart by a second distance ($S_2$) from a second left axis defined by the second left roller group. The middle axis defined by the middle roller group is spaced apart by a third distance ($S_3$) from a first right axis defined by the first right roller group. The first right axis defined by the first right roller group is spaced apart by a fourth distance ($S_4$) from a second right axis defined by the second right roller group. Moreover, $0.95(S_1) \leq S_2 \leq 1.05(S_1)$, $S_1 \leq 0.85(S_3)$, and $0.95(S_3) \leq S_4 \leq 1.05(S_3)$.

It is therefore an object of the present invention to provide a new and useful undercarriage assembly.

It is another object of the present invention to provide an improved undercarriage assembly.

It is moreover an object of the present invention to provide an undercarriage assembly which provides for low-vibration operation of a track-type work machine.

The above and other objects, features, and advantages of the present invention will become apparent from the following description and the attached drawings.

DETAILED DESCRIPTION OF THE PREFERRED EMBODIMENT

Figure 1:
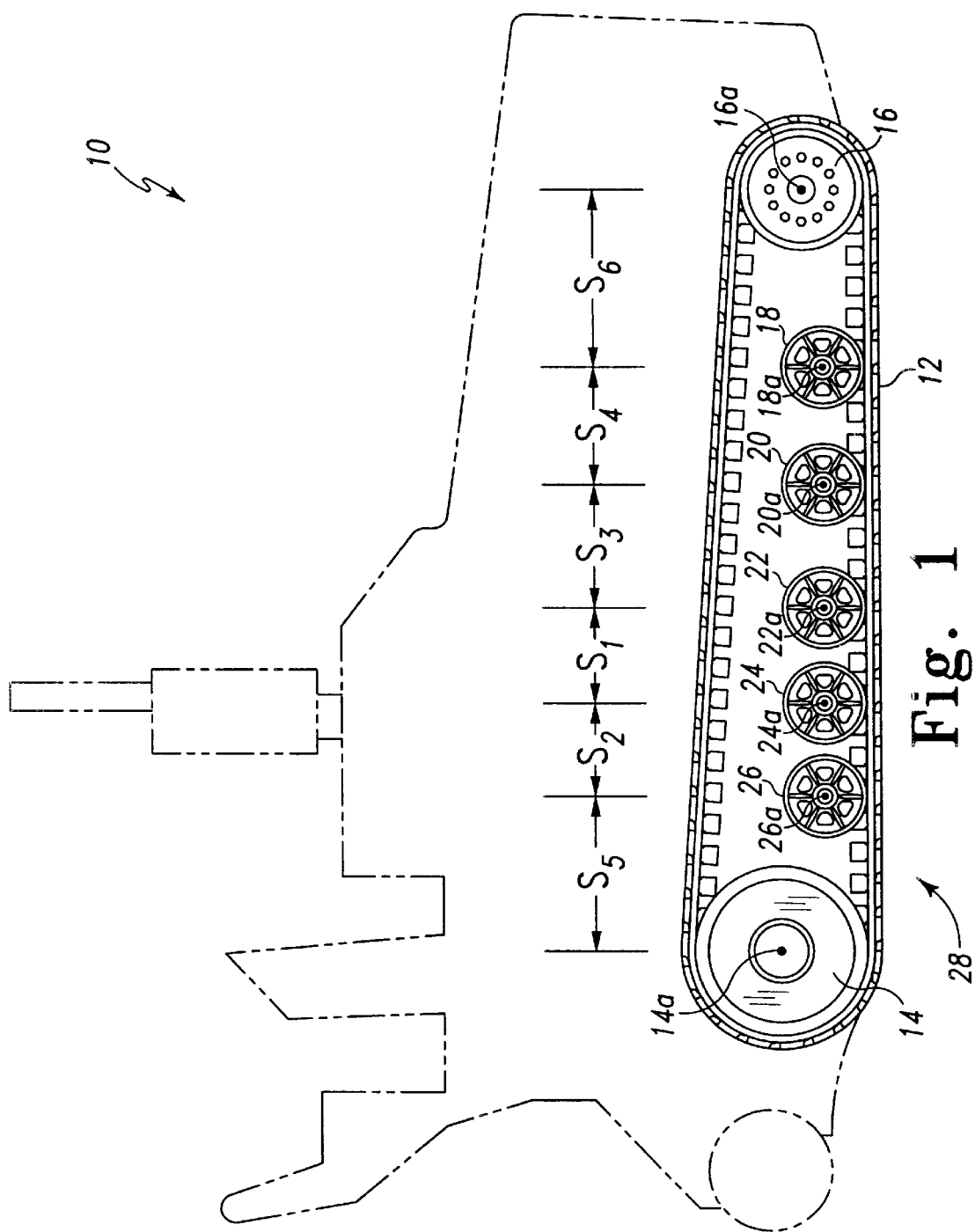
FIG. 1 is a diagrammatic side elevational view of a track-type work machine which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a track-type work machine or asphalt paver 10. The asphalt paver 10 includes an endless track belt 12, a drive wheel 14, an idler wheel 16, and a plurality of track supporting roller groups 18, 20, 22, 24, and 26. Each of the roller groups 18, 20, 22, 24, and 26 includes a pair of side-by-side mounted track supporting rollers (see FIG. 6). Collectively, the track belt 12, the drive wheel 14, the idler wheel 16, and the roller groups 18, 20, 22, 24, and 26 are referred to as an undercarriage assembly 28.

The drive wheel 14 is coupled to a drive motor (not shown) thereby providing the motive power for moving the track belt 12 and hence the asphalt paver 10. Moreover, the roller groups 18, 20, 22, 24, and 26 are used to guide and support the track belt 12 as the asphalt paver 10 travels over various surface conditions.

Along with the drive wheel 14, the idler wheel 16 reverses the direction of travel of the track belt 12 as shown in FIG. 1. In addition, the idler wheel 16 maintains tension on the track belt 12 so as to prevent the track belt 12 from derailing.

Figure 2:
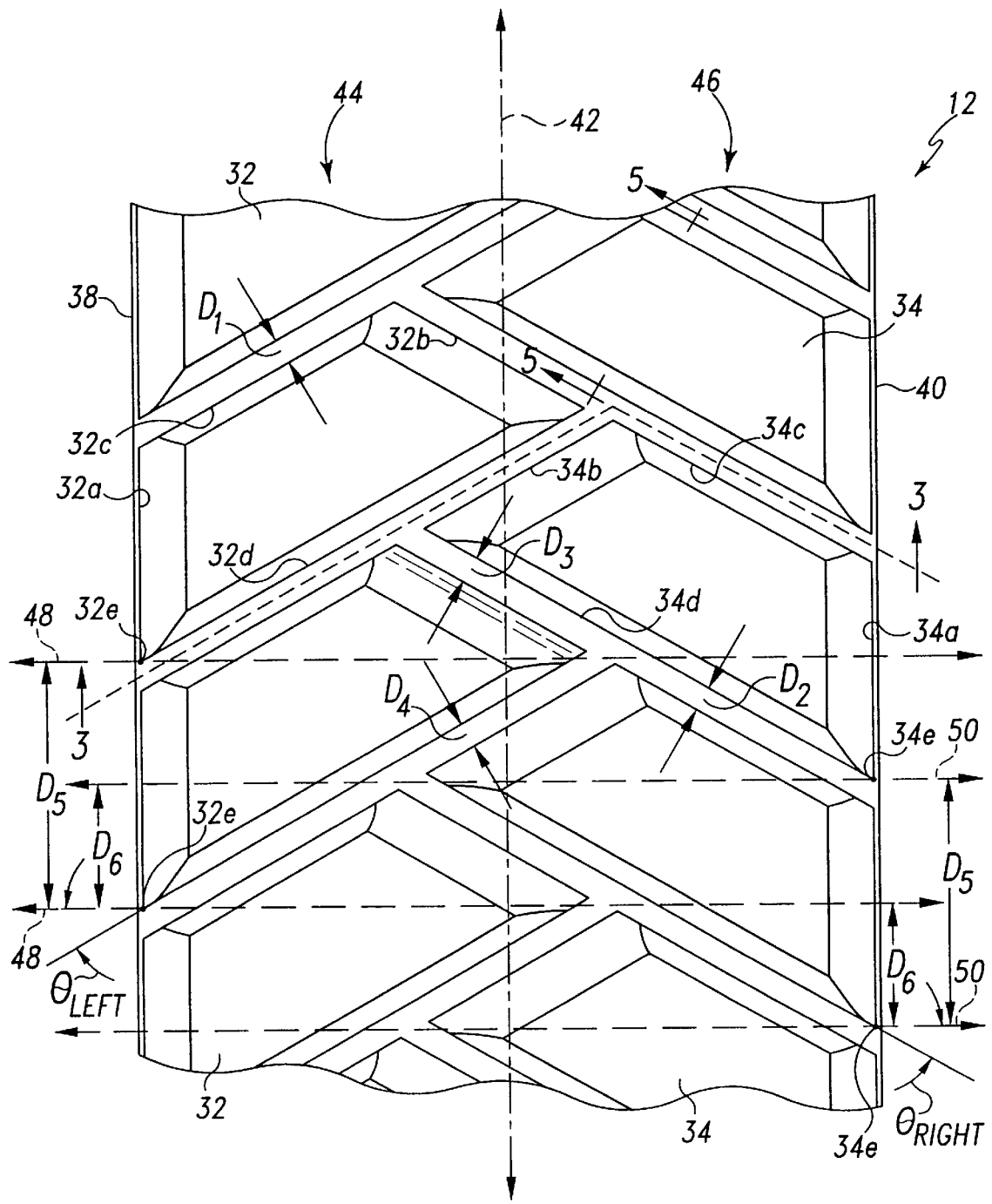
FIG. 2 is a fragmentary top elevational view of a track belt of the track-type work machine of FIG. 1.
Figure 3:
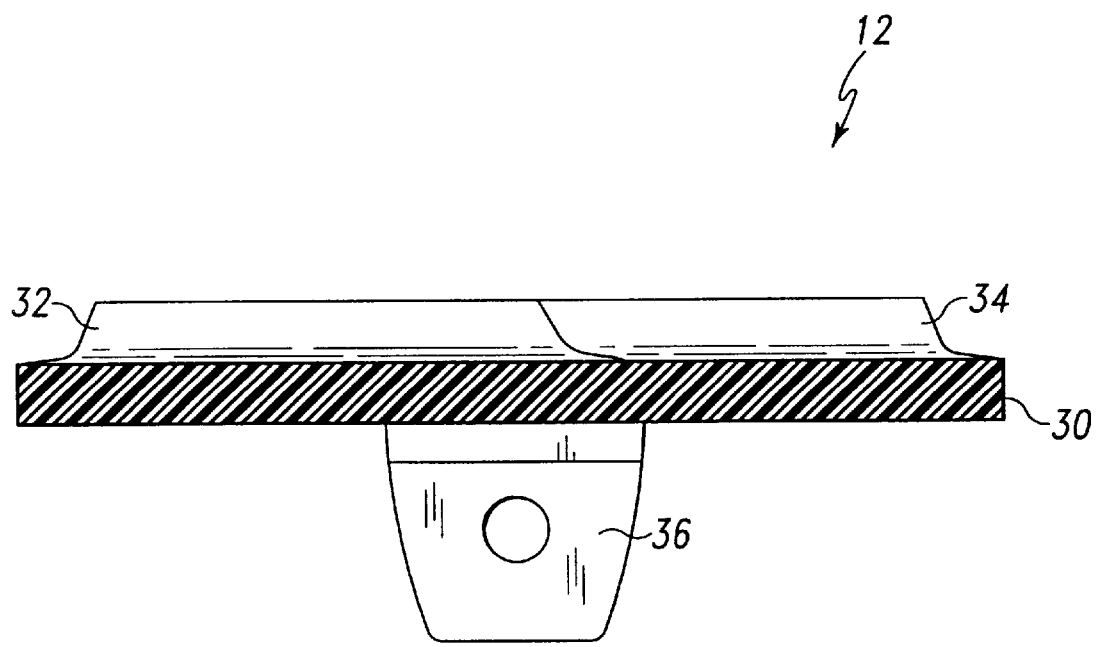
FIG. 3 is a cross sectional view of the track belt taken along the lines 3—3 of FIG. 2.
Figure 4:
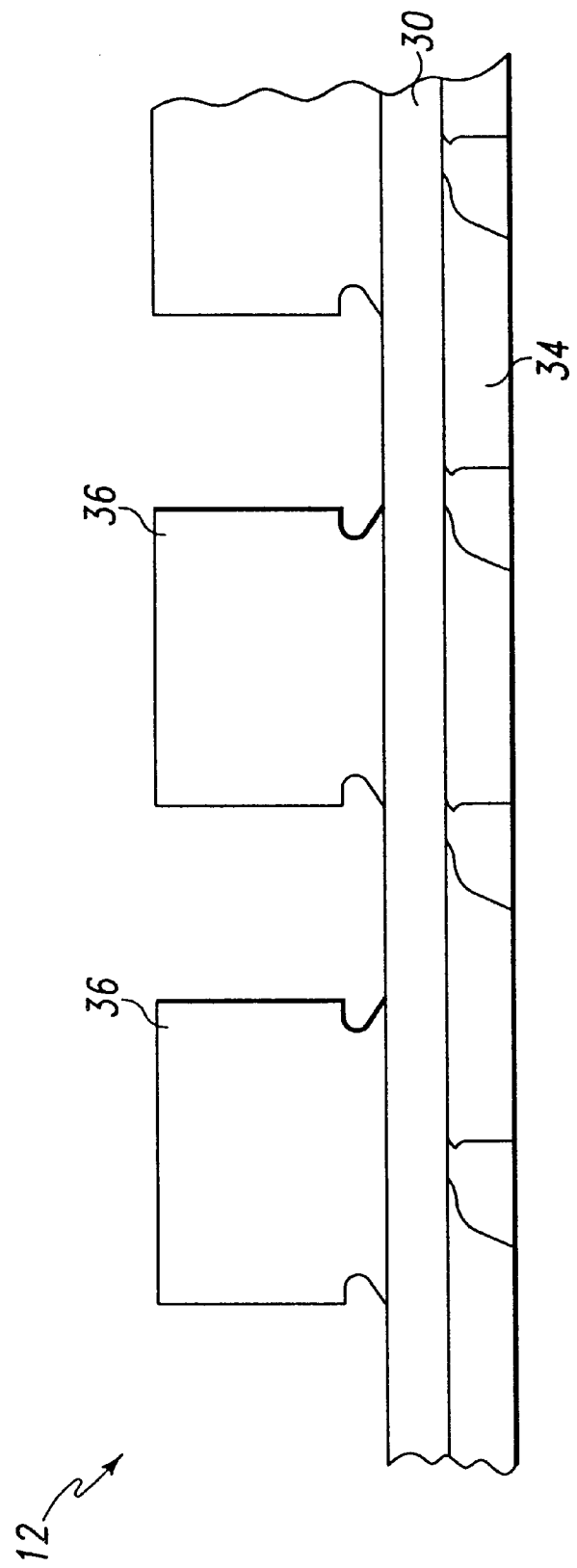
FIG. 4 is a is a side elevational view of the track belt of FIG. 2.

Referring now to FIGS. 2–5, there is shown the track belt 12. The track belt 12 includes a track base or carcass 30, a plurality of left tread bars 32, a plurality of right tread bars 34, and a number of guide blocks 36. As seen in FIG. 3, the left tread bars 32 and the right tread bars 34 are affixed to the carcass 30 and extend upwardly therefrom. Preferably, the track belt 12 includes fifty-four left tread bars 32 and fifty-four right tread bars 34.

The track belt 12 further includes a left lateral edge 38 and a right lateral edge 40. The track belt 12 defines a midline 42. The midline 42 is parallel to the left lateral edge 38 and the right lateral edge 40 and is spaced equidistant therefrom. More specifically, the midline 42 defines a central axis which divides the track belt into two equal regions. In particular, the area bounded by the midline 42 and the left lateral edge 38 defines a left region 44, whereas the area bounded by the midline 42 and the right lateral edge 40 defines a right region 46.

Each of the left tread bars 32 includes an outer edge 32a, an inner edge 32b, a leading edge 32c, and a trailing edge 32d. As shown in FIG. 2, the outer edge 32a of the left tread bars 32 is positioned adjacent the left lateral edge 38. Each of the left tread bars 32 extends inwardly so as to position the inner edge 32b thereof in the right region 46. Although a portion of each of the left tread bars 32 is positioned in the right region 46, a majority (i.e. greater than 50%) of the surface area of each of the left tread bars 32 is positioned in the left region 44. Moreover, the leading edge 32c of a given left tread bar 32 is parallel to and separated by distance $D_1$ from the trailing edge 32d of an adjacent left tread bar 32. Preferably, the magnitude of the distance $D_1$ is 14.9 mm.

The track belt 12 further defines a number of first lateral lines 48. As shown in FIG. 2, the first lateral lines 48 are perpendicular to the left lateral edge 38 and the midline 42. Each of the trailing edges 32d and a first lateral line 48 define an angle $\Theta_{LEFT}$. Preferably, the magnitude of $\Theta_{LEFT}$ is 30°.

Each of the right tread bars 34 includes an outer edge 34a, an inner edge 34b, a leading edge 34c, and a trailing edge 34d. As shown in FIG. 2, the outer edge 34a of the right tread bars 34 is positioned adjacent the right lateral edge 40. Each of the right tread bars 34 extends inwardly so as to position a portion of the inner edge 34b thereof in the left region 44. Although a portion of each of the right tread bars 34 is positioned in the left region 44, a majority (i.e. greater than 50%) of the surface area of each of the right tread bars 34 is positioned in the right region 46. Moreover, the leading edge 34c of a given right tread bar 34 is parallel to and separated by distance $D_2$ from the trailing edge 34d of an adjacent left tread bar 34. Preferably, the magnitude of the distance $D_2$ is 14.9 mm.

The track belt 12 further defines a number of second lateral lines 50. As shown in FIG. 2, the second lateral lines 50 are perpendicular to the right lateral edge 40 and the midline 42. Each of the trailing edges 34d and a second lateral line 50 define an angle $\Theta_{RIGHT}$. Preferably, the magnitude of $\Theta_{RIGHT}$ is 30°.

The inner edge 32b of a given left tread bar 32 is parallel to and separated by a distance $D_3$ from the trailing edge 34d of an adjacent right tread bar 34 as shown in FIG. 2. Similarly, the inner edge 34b of a given right tread bar 34 is parallel to and separated by a distance $D_4$ from the trailing edge 32d of an adjacent left tread bar 32. The magnitude of the distance $D_3$ equals the magnitude of the distance $D_4$ and is preferably 17.4 mm. Although the magnitude of the distances $D_3$ and $D_4$ is described as 17.4 mm and has significant benefits in its use in the present invention, another magnitude of the distances $D_3$ and $D_4$ may be used to achieve many of the advantages of the present invention. For example, the magnitude of the distances $D_3$ and $D_4$ may be 14.9 mm.

The distance between a trailing point 32e of a given left tread bar 32 and the trailing point 32e of an adjacent left tread bar 32 defines a pitch which is indicated by a distance $D_5$ as shown in FIG. 2. Similarly, the distance between a trailing point 34e of a given right tread bar 34 and the trailing point 34e of an adjacent right tread bar 32 defines a pitch which is indicated by the distance $D_5$ as shown in FIG. 2.

A given left tread bar 32 is "offset" from an adjacent right tread bar 34 by a distance $D_6$. In addition, a given right tread bar 34 is "offset" from an adjacent left tread bar 32 by the distance $D_6$. What is meant herein by the term "offset" is that a trailing point 32e of a given left tread bar 32 lies on one of the first lateral lines 48, and a trailing point 34e of an adjacent right tread bar 34 lies on one of the second lateral lines 50, and the first lateral line 48 and the second lateral line 50 are separated by a distance $D_6$ as shown in FIG. 2. The distance $D_6$ equals one-half (½) of the distance $D_5$. Preferably, the magnitudes of the distances $D_5$ and $D_6$ are as follows: $D_5$=152.30 mm and $D_6$=76.15 mm.

Figure 5:
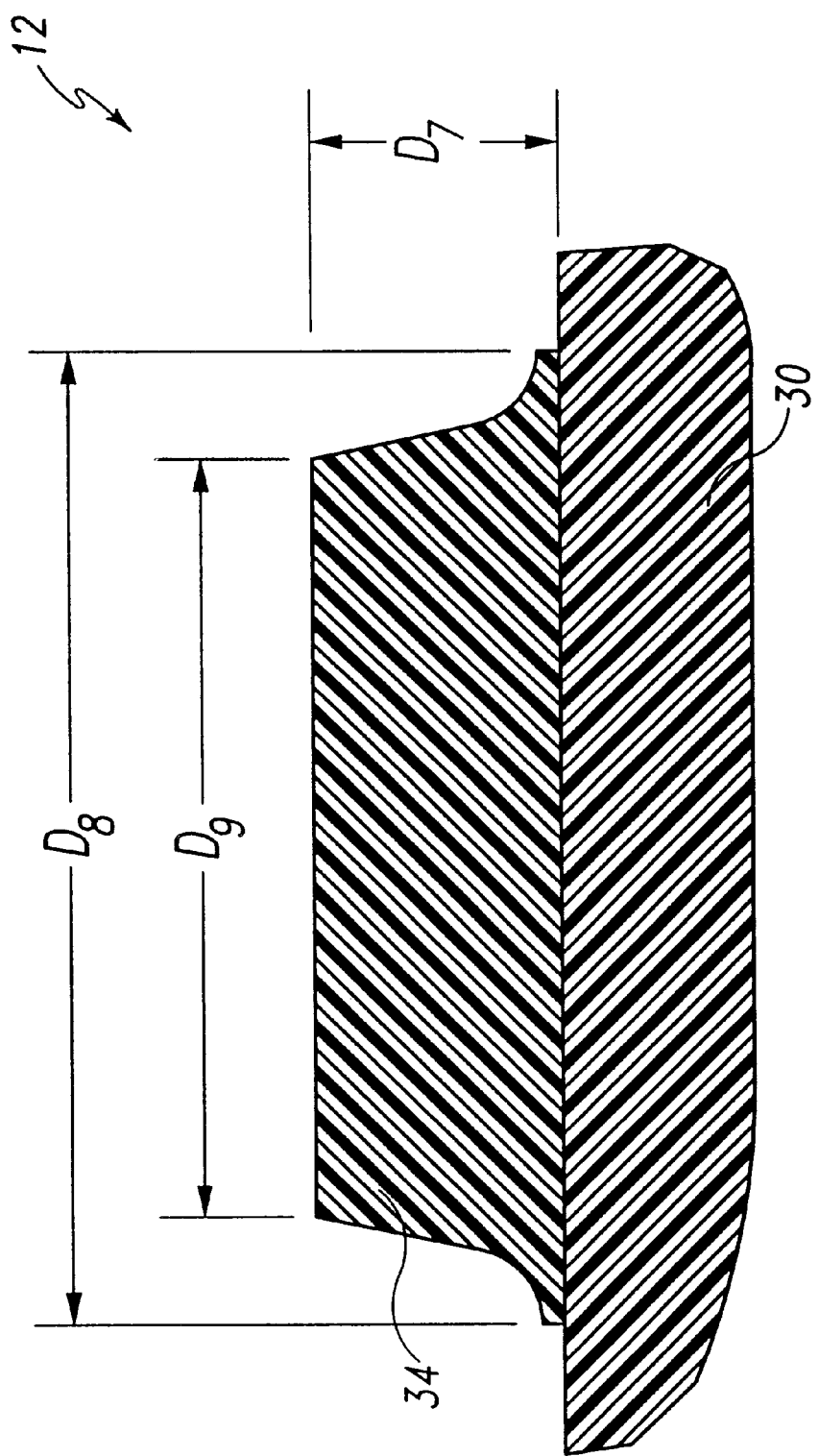
FIG. 5 is a cross-sectional view taken along the line 5—5 of FIG. 2, as viewed in the direction of the arrows.

The height of each of the left tread bars 32 and the right tread bars 34 is indicated by a distance $D_7$ as shown in FIG. 5. Moreover, the base width of each of the left tread bars 32 and the right tread bars 34 is indicated by a distance $D_8$, whereas the face width of each of the left tread bars 32 and the right tread bars 34 is indicated by the distance $D_9$. Preferably, the magnitudes of the distances $D_7$, $D_8$, and $D_9$ are as follows: $D_7$=30.0 mm, $D_8$=117.0 mm, and $D_9$=90.0 mm.

Figure 6:
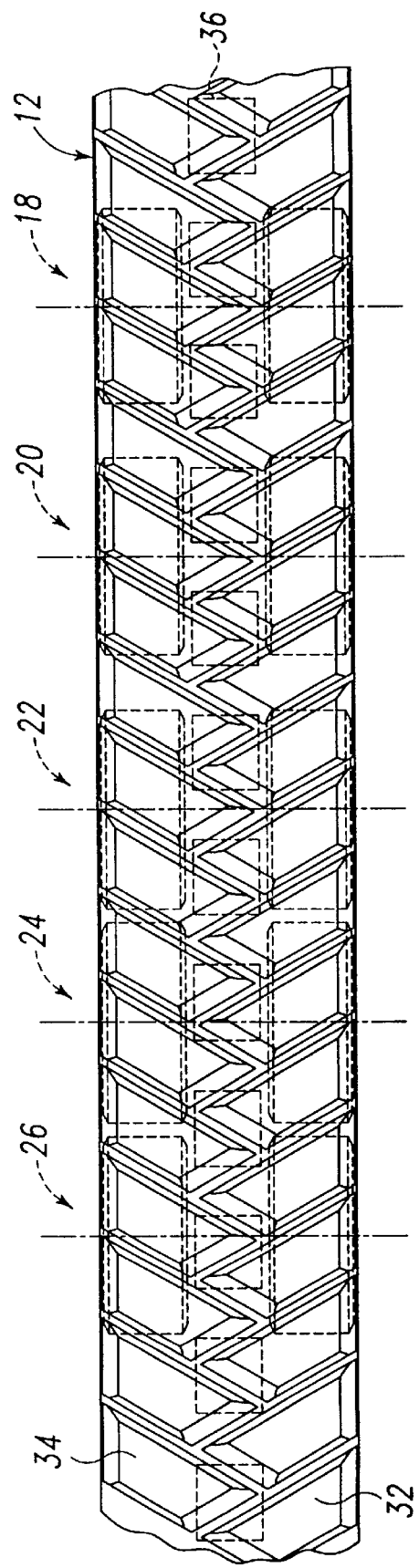
FIG. 6 is a fragmentary bottom elevational view of an undercarriage assembly of the track-type work machine of FIG. 1.
Figure 7:
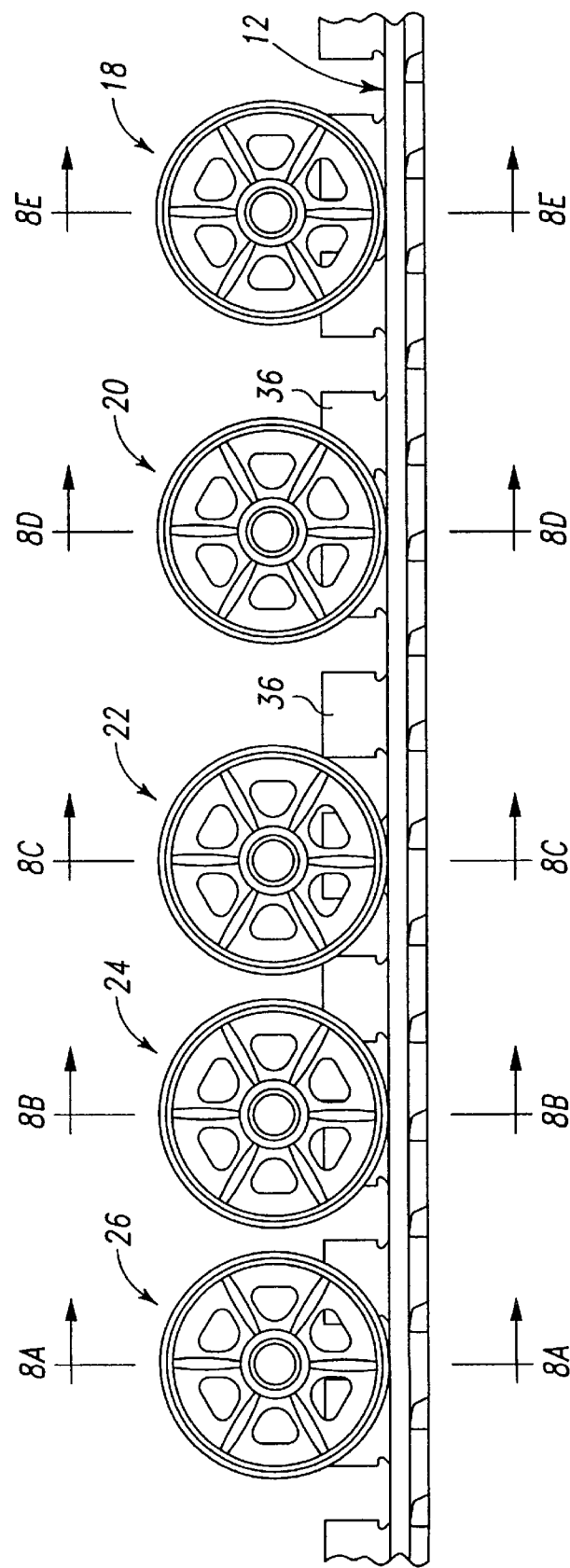
FIG. 7 is a fragmentary side elevational view of the undercarriage assembly of FIG. 6.
Figure 8C:
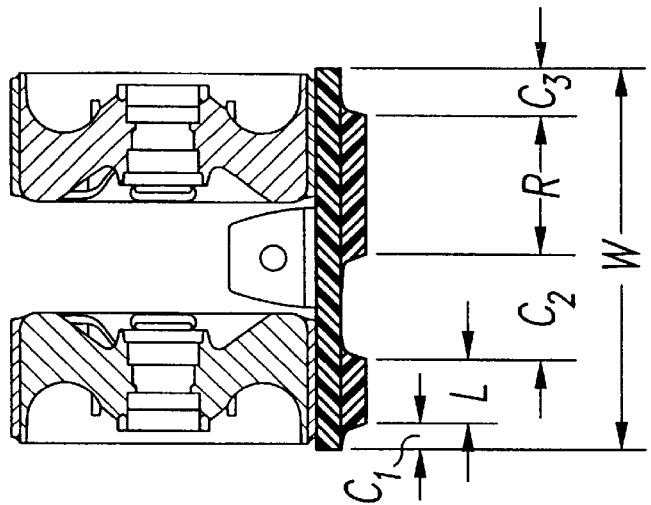
FIGS. 8A–8E are cross sectional views taken along the lines 8A—8A, 8B—8B, 8C—8C, 8D—8D, and 8E—8E, respectively, of FIG. 7, as viewed in the direction of the arrows.
Figure 8B:
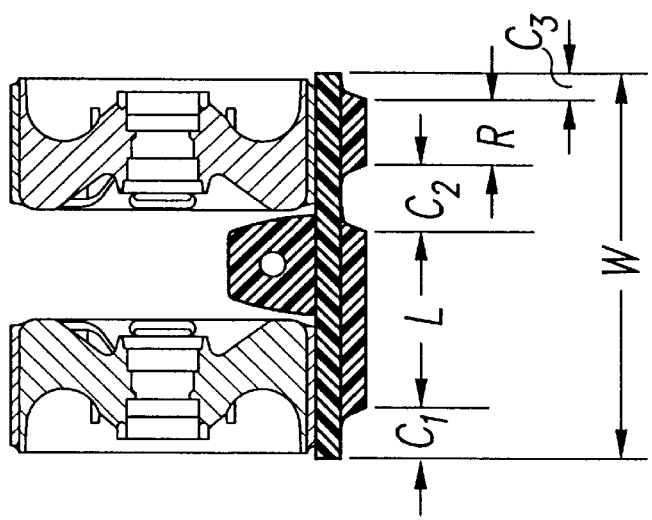
Figure 8A:
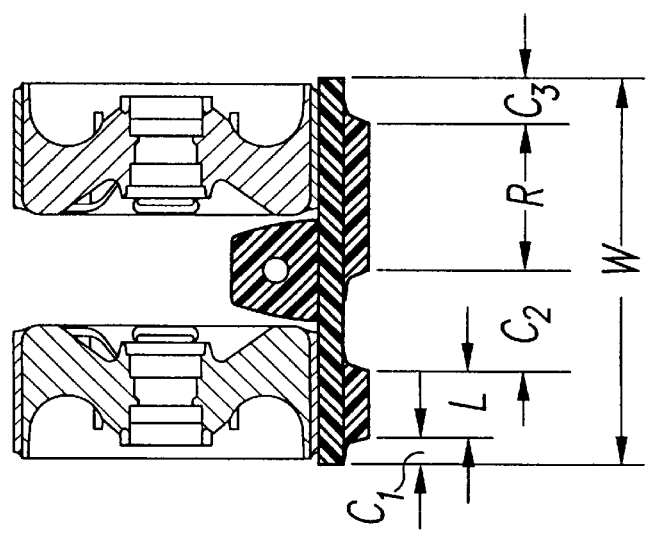
Figure 8D:
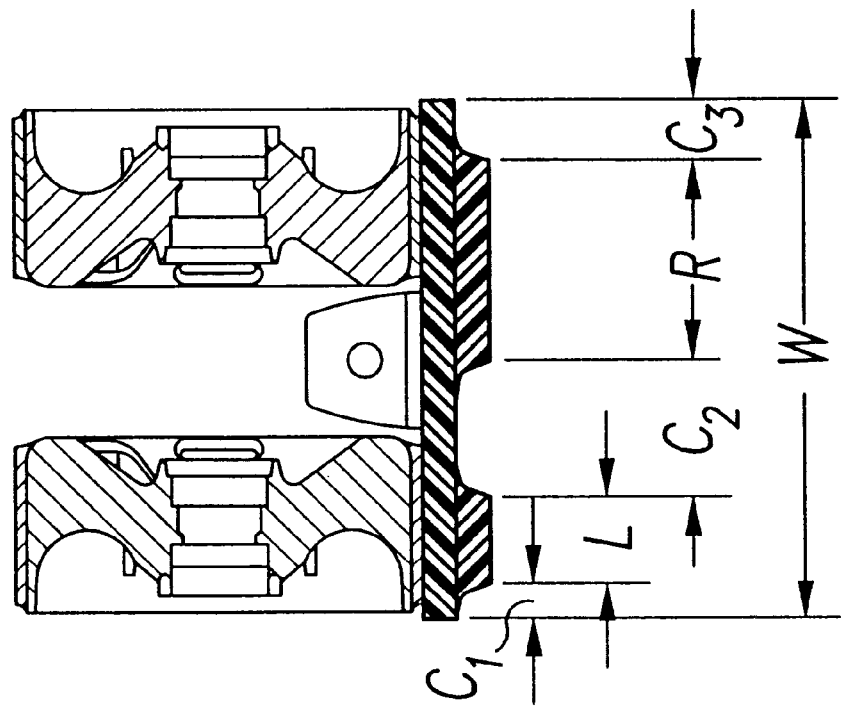
Figure 8E:
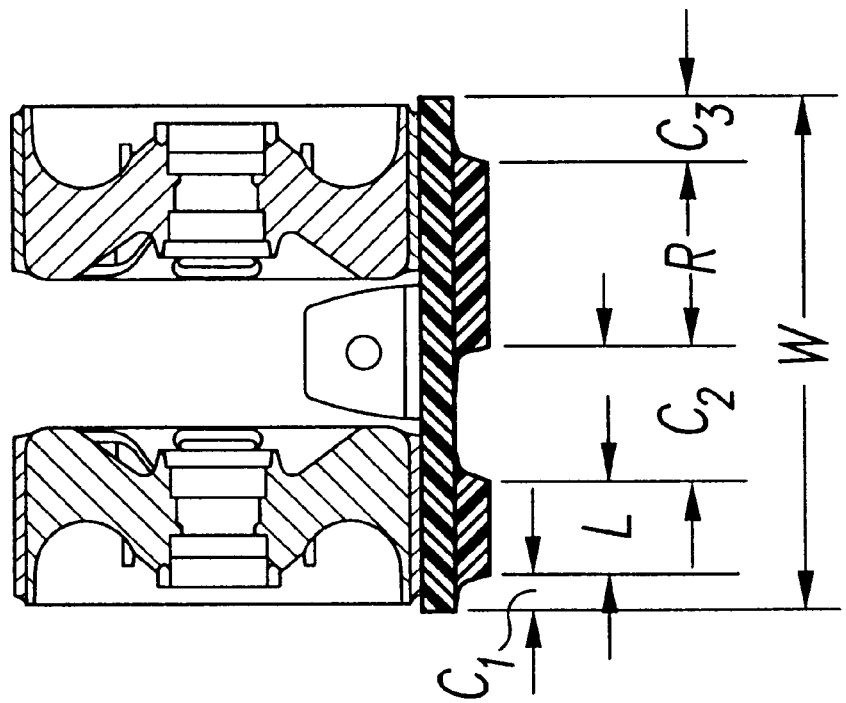

Referring now to FIGS. 6–8, there is shown the relationship between the track belt 12 and the roller groups 18, 20, 22, 24, and 26. The guide blocks 36 are advanced between each of the track supporting rollers included in the roller groups 18, 20, 22, 24, and 26 thereby preventing the track belt 12 from derailing.

The center of rotation of each of the roller groups 18, 20, 22, 24, and 26 defines an axis 18a, 20a, 22a, 24a, and 26a, respectively, as shown in FIG. 1. More specifically, the center of rotation of the roller group 18 defines a first left axis 18a, whereas the center of rotation of the roller group 20 defines a second left axis 20a. The center of rotation of the roller group 22 defines a middle axis 22a. Moreover, the center of rotation of the roller group 24 defines a first right axis 24a, whereas the center of rotation of the roller group 26 defines a second right axis 26a. The center of rotation of the drive wheel 14 and the idler wheel 16 defines an axis 14a and 16a, respectively. More specifically, the center of rotation of the drive wheel 14 defines a drive axis 14a, whereas the center of rotation of the idler wheel 16 defines an idler axis 16a.

As shown in FIG. 1, the axis 22a is spaced apart from the axis 24a by a distance $S_1$, whereas the axis 24a is spaced apart from the axis 26a by a distance $S_2$. Moreover, the axis 22a is spaced apart from the axis 20a by a distance $S_3$, whereas the axis 20a is spaced apart from the axis 18a by a distance $S_4$. Moreover, the axis 14a is spaced apart from the axis 26a by a distance $S_5$, whereas the axis 16a is spaced apart from the axis 18a by a distance $S_6$. Preferably, the magnitudes of the distances $S_1$, $S_2$, $S_3$, $S_4$, $S_5$, and $S_6$ are as follows: $S_1$=387 mm, $S_2$=394 mm, $S_3$=487 mm, $S_4$=473 mm, $S_5$=580 mm, and $S_6$=701 mm.

The track belt 12 has a width (W) as shown in each of FIGS. 8A–8E. At any given time, each roller group 18, 20, 22, 24, and 26 contacts the track belt 12. Each roller group 18, 20, 22, 24, and 26 defines a first width portion (L) of the width (W) of the track belt 12. Each roller group 18, 20, 22, 24, and 26 also defines a second width portion (R) of the width (W) of the track belt 12. The first width portion (L) represents the cross sectional width of a respective left tread bar 32 which is located directly below a respective roller group 18, 20, 22, 24, and 26. Similarly, the second width portion (R) represents the cross sectional width of a respective right tread bar 34 which is located directly below a respective roller group 18, 20, 22, 24, and 26. The section of the left tread bar 32 defined by the first width portion (L) and the section of the right tread bar 34 defined by the second width portion (R) cooperate to support the weight of the asphalt paver 10 being exerted on the respective roller group 18, 20, 22, 24, and 26.

The remaining portions ($C_1$, $C_2$, and $C_3$) of the width (W) of the track belt 12 include the areas of the carcass 30 which do not have the left tread bars 32 or the right tread bars 34 secured thereto. It should be appreciated that: $W=L+R+C_1+C_2+C_3$.

The configuration of the track belt 12 reduces vibrations and shocks during operation of the asphalt paver 10. Reduction of vibrations and shocks is achieved by creating a tread bar pattern on the track belt 12 such that at any given point of advancement of the track belt 12, (1) the first width portion (L) is of sufficient magnitude so as to support the weight exerted by the asphalt paver 10 on a respective left roller of a roller group 18, 20, 22, 24, and 26, and (2) the second width portion (R) is of sufficient magnitude so as to support the weight exerted by the asphalt paver 10 on a respective right roller of a roller group 18, 20, 22, 24, and 26. This should be true for each roller group 18, 20, 22, 24, and 26 of the undercarriage assembly 28.

As described above, the track belt 12 and the roller groups 18, 20, 22, 24, and 26 cooperate so as to reduce the number of vibrations and shocks during operation of the asphalt paver 10. The reduction of such vibrations and shocks reduces the occasions of upward or downward movement of the asphalt paver 10 which in turn increases the quality of the work being performed by the asphalt paver 10 (e.g. the application of asphalt).

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. An undercarriage assembly of a tracktype work machine, comprising:
   a drive wheel,
   an idler wheel,
   a plurality of track supporting rollers, and
   a track belt which contacts said drive wheel, said idler wheel, and each of said plurality of track supporting rollers, said track belt includes:
      a track base having a left lateral edge and a right lateral edge, said track base defining a midline spaced equidistant from said left lateral edge and said right lateral edge so as to define a left region and a right region;
      a plurality of left-tread bars secured to said track base, each left tread bar having an outer edge, and said outer edge of said each left tread bar being positioned adjacent to said left lateral edge of said track base; and
      a plurality of right tread bars secured to said track base, each right tread bar having an outer edge, and said outer edge of said each right tread bar being positioned adjacent to said right lateral edge of said track base,
      wherein (1) a portion of said each left tread bar is positioned in said right region, and (2) a portion of said each right tread bar is positioned in said left region, (3) a majority of said each left tread bar is positioned in said left region, and (4) a majority of said each right tread bar is positioned in said right region,
   wherein said plurality of track supporting rollers includes a first left roller group, a second left roller group, a middle roller group, a first right roller group, and a second right roller group,
   wherein a first left axis defined by said first left roller group is spaced apart by a first distance ($S_1$) from a middle axis defined by said middle roller group,
   wherein said first left axis defined by said first left roller group is spaced apart by a second distance ($S_2$) from a second left axis defined by said second left roller group,
   wherein said middle axis defined by said middle roller group is spaced apart by a third distance ($S_3$) from a first right axis defined by said first right roller group,
   wherein said first right axis defined by said first right roller group is spaced apart by a fourth distance ($S_4$) from a second right axis defined by said second right roller group,
   wherein $0.95(S_1) \leq S_2 \leq 1.05(S_1)$,
   wherein $S_1 \leq 0.85(S_3)$, and
   wherein $0.95(S_3) \leq S_4 \leq 1.05(S_3)$.

2. The under carriage assembly of claim 1, wherein:
   $0.98(S_1) \leq S_2 \leq 1.02(S_1)$,
   $S_1 \leq 0.80(S_3)$, and
   $0.97(S_3) \leq S_4 \leq 1.03(S_3)$.

3. The undercarriage assembly of claim 2, wherein said plurality of track supporting rollers are interposed between said drive wheel and said idler wheel.

4. The undercarriage assembly of claim 3, wherein $S_1$, $S_2$, $S_3$, and $S_4$ approximately satisfy the following equalities:
   $S_1$=387 mm,
   $S_2$=394 mm,
   $S_3$=487 mm, and
   $S_4$=73 mm.

5. The undercarriage assembly of claim 4 wherein:
   a drive axis defined by said drive wheel is spaced apart by a fifth distance ($S_5$) from said second left axis defined by said second left roller group,
   an idler axis defined by said idler wheel is spaced apart by a sixth distance ($S_6$) from said second right axis defined by said second right roller group,
   $S_5$=580 mm, and
   $S_6$=701 mm.

6. The undercarriage assembly of claim 1, wherein:
   said track base defines a plurality of first lateral lines which are each perpendicular to said midline, said plurality of left tread bars each include a trailing edge, each trailing edge of said plurality of left tread bars and a respective first lateral line of said plurality of first lateral lines define a first angle which is equal to approximately 30°, said track base further defines a plurality of second lateral lines which are each perpendicular to said midline, said plurality of right tread bars each include a trailing edge, and each trailing edge of said plurality of right tread bars and a respective second lateral line of said plurality of second lateral lines respectively define a second angle which is equal to approximately 30°.

7. The undercarriage assembly of claim 1, wherein:

said plurality of left tread bars include a first left tread bar which is positioned adjacent to a second left tread bar, said first left tread bar and said second left tread bar define a predetermined pitch, said plurality of left tread bars include a first right tread bar which is positioned adjacent to a second right tread bar, said first right tread bar and said second right tread bar define said predetermined pitch, and said first left tread bar is offset from said first right tread bar by a distance equal to one-half of said predetermined pitch.

8. The undercarriage assembly of claim 1, wherein:

said plurality of left tread bars includes fifty-four left tread bars, and said plurality of right tread bars includes fifty-four right tread bars.

9. The undercarriage assembly of claim 8, wherein:

each of said plurality of left tread bars possesses a height of approximately 30 mm, and each of said plurality of right tread bars possesses a height of approximately 30 mm.

10. The undercarriage assembly of claim 9, wherein:

each of said plurality of left tread bars possesses a base width of approximately 117 mm, and a face width of approximately 90 mm, and each of said plurality of right tread bars possesses a base width of approximately 117 mm, and a face width of approximately 90 mm.

11. The undercarriage assembly of claim 1, wherein:

each of said plurality of left tread bars includes a leading edge, a trailing edge, and an inner edge, said plurality of left tread bars include a first left tread bar which is positioned adjacent to a second left tread bar, said leading edge of said first left tread bar is parallel to said trailing edge of said second left tread bar, each of said plurality of right tread bars includes a leading edge, a trailing edge, and an inner edge, said plurality of said right tread bars include a first right tread bar which is positioned adjacent to a second right tread bar, and said leading edge of said first right tread bar is parallel to said trailing edge of said second right tread bar.

12. The undercarriage assembly of claim 11, wherein:

said inner edge of said first right tread bar is parallel to said trailing edge of said first left tread bar.

13. The undercarriage assembly of claim 12, wherein:

said leading edge of said first left tread bar is spaced apart from said trailing edge of said second left tread bar by a first distance, said leading edge of said first right tread bar is spaced apart from said trailing edge of said second right tread bar by a second distance, and said first distance is equal to said second distance.

14. The undercarriage assembly of claim 13, wherein:

said inner edge of said first right tread bar is spaced apart from said trailing edge of said first left tread bar by a third distance, and said third distance is greater than said first distance.

* * * * *

UNITED STATES PATENT AND TRADEMARK OFFICE
CERTIFICATE OF CORRECTION

PATENT NO. : 5,913,374

DATED : June 22, 1999

INVENTOR(S) : Becker, et al.

It is certified that error appears in the above-identified patent and that said Letters Patent is hereby corrected as shown below:

Claim 4, line 54:

Delete "$S_4$=73 mm"

Add --$S_4$=473 mm--

Signed and Sealed this

Twenty-third Day of November, 1999

*Attest:*

Q. TODD DICKINSON

*Attesting Officer*   *Acting Commissioner of Patents and Trademarks*